United States Patent Office 3,784,643
Patented Jan. 8, 1974

3,784,643
ARYLOXYALKYLGUANIDINES
John T. Suh, Mequon, and Joseph A. Skorcz, Milwaukee, Wis., assignors to Colgate-Palmolive Company, New York, N.Y.
No Drawing. Continuation-in-part of application Ser. No. 755,744, Aug. 27, 1968. This application Dec. 11, 1970, Ser. No. 97,312
Int. Cl. C07c 129/00
U.S. Cl. 260—564 A    2 Claims

ABSTRACT OF THE DISCLOSURE

The compounds are aryloxyalkylguanidines which are useful as central nervous system depressants and antihypertensive agents. A compound disclosed in the application is 1-methyl-2-(2-methoxy-5-fluorophenoxy)-ethylguanidine nitrate.

RELATED CASE

The present application is a continuation-in-part of our earlier application Ser. No. 755,744 filed Aug. 27, 1968 now abandoned.

DETAILED DESCRIPTION

The novel compounds of the present invention have the following formula:

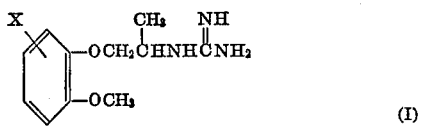

(I)

in which X is selected from fluoro and trifluoromethyl.

The compounds of the present invention may be conveniently prepared by employing as the basic starting material a compound of the formula

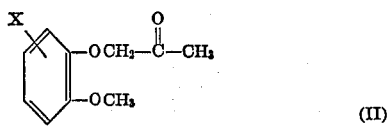

(II)

in which X is as previously defined and does not interfere with or partake in the reaction. Representative of the starting materials which may be employed are the following:

1-(2-methoxy-3-fluorophenoxy)-2-propanone,
1-(2-methoxy-4-fluorophenoxy)-2-propanone,
1-(2-methoxy-5-fluorophenoxy)-2-propanone,
1-(2-methoxy-6-fluorophenoxy)-2-propanone,
1-(2-methoxy-4-trifluoromethylphenoxy)-2-propanone, and
1-(2-methoxy-5-trifluoromethylphenoxy)-2-propanone.

In the preferred method of preparation of the compounds of the present invention, the ketone starting material is reacted with hydroxylamine hydrochloride in the presence of an acid receptor at slightly elevated temperatures in a 50% aqueous ethanol medium until the reaction is complete which is approximately 16 hours. The resulting oxime is then dissolved in ethanol and treated with hydrogen under pressure (1200 p.s.i.) in the presence of a Raney nickel catalyst at about 25° C. until the theoretical amount of hydrogen has been utilized. The reaction mixture is then filtered and diluted with ether. The gummy precipitate which forms is treated with ether followed by concentrated potassium hydroxide solution. The ether layer is separated, dried and evaporated to yield the ethylamine derivative as an oil. The amine thus obtained is reacted with 1-amidino-3,4-dimethylpyrazole nitrate under nitrogen at an oil bath temperature of about 100° C. until the reaction is complete, which is approximately 3 hours. If desired, the amine may be converted to the guanidine derivative by employing conventional techniques utilizing cyanamide or s-methylthiopseudourea in place of 1-amidino-3,4-dimethylpyrazole nitrate. The resulting product is treated rapidly with dry ether, filtered, dried and recrystallized from an ethanol-ether mixture to yield the desired ethylguanidine derivative in a purified form.

The above described process may be illustrated as follows:

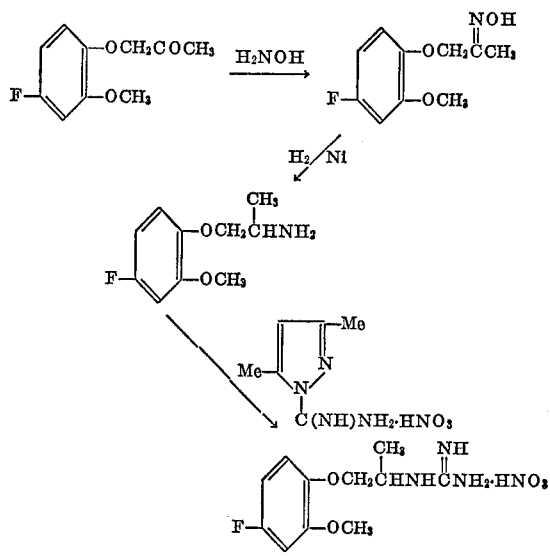

Representative of the compounds which may be prepared in the described manner are the following:

1-methyl-2-(2-methoxy-3-fluorophenoxy)-ethylguanidine nitrate,
1-methyl-2-(2-methoxy-4-fluorophenoxy)-ethylguanidine nitrate,
1-methyl-2-(2-methoxy-5-fluorophenoxy)-ethylguanidine nitrate,
1-methyl-2-(2-methoxy-6-fluorophenoxy)-ethylguanidine nitrate,
1-methyl-2-(2-methoxy-4-trifluoromethylphenoxy)-ethylguanidine nitrate, and
2-(2-methoxy-5-trifluoromethylphenoxy)-ethylguanidine nitrate.

In behavioral screening tests in mice the compound 1 - methyl - 2 - (2-methoxy-5-fluorophenoxy)-ethylguanidine nitrate exhibited a central nervous system depressant activity. Mice receiving doses of 30 mg./kg. or more of the compound intraperitoneally in the form of 5% acacia suspension exhibited evidence of central nervous system depression. As a result of the behavioral tests the compound was found to have an $LD_{50}$ in excess of 175 mg./kg. intraperitoneally. The behavioral study was conducted in accordance with the procedure set forth by Irwin in "Animal and Clinical Pharmacologic Techniques in Drug Evaluation," J. H. Nodine and P. E. Siegler, Ed., Year Book Publishers, Inc. 1964, pp. 36–54.

The forementioned compound was also found to be effective in lowering blood pressure when administered in 1.0, 3.0 and 10.0 mg./kg. intravenous doses to the vagotomized, anesthetized dog preparation which is a standard animal preparation for testing antihypertensive activity.

When intended for pharmaceutical use the compounds of the present invention are preferably combined with one or more suitable pharmaceutical diluents and formed into unit dosage forms suitable for oral or parenteral administration. The pharmaceutical diluents which may be employed may be either liquid or solid but the preferred liquid diluent is Water for Injection USP.

The compounds of the invention are preferably employed in pharmaceuticals in the form of nontoxic pharmaceutically acceptable acid addition salts of pharmaceutically acceptable acids, e.g. the nitrate, sulfate or hydrochloride salts.

Generally, the dosage forms of the compounds will contain 5 to 100 mg. of the active ingredients. One or more of such dosage forms may be administered to the patient daily depending upon the condition, the size and age of the patient.

The following examples are presented to illustrate the invention:

Example 1.—1-(2-methoxyphenoxy)-2-propanone oxime

A solution of 1-(o-methoxyphenoxy)-2-propanone (18 g., 0.1 mole), hydroxylamine hydrochloride (7.6 g., 0.11 mole), and sodium acetate trihydrate (15 g., 0.11 mole) is heated in 250 ml. of 50% aqueous ethanol at 40° for 16 hours, then evaporated to near dryness under vacuum. Water is added to the residue and the organic layer taken up in ether which is dried ($Na_2SO_4$) and evaporated to afford a white solid. Recrystallization from cyclohexane affords 1-(2-methoxyphenoxy)-2-propanone oxime as white needles, M.P. 77–79°.

Example 2.—1-methyl-2-(2-methoxyphenoxy)-ethylamine

A solution of 1-(o-methoxyphenoxy)-2-propanone oxime (24.4 g., 0.125 mole) in 150 ml. of ethanol is treated with hydrogen at 1200 p.s.i. and 25° in the presence of a Raney nickel catalyst. After 20 hours the mixture is filtered, and the filtrate concentrated, diluted with ether, treated with dry HCl, and refrigerated. After several days the ether is decanted from the gummy precipitate, and fresh ether is added followed by 100 ml. of concentrated KOH solution. The ether layer is separated, dried ($K_2CO_3$), and evaporated to afford an amber oil. Distillation affords 1-methyl-2-(2-methoxyphenoxy)-ethylamine as a colorless liquid, B.P. 93–95° (0.15 mm.).

Analysis.—Calcd. for $C_{10}H_{15}NO_2$ (percent): C, 66.27; H, 8.34; N, 7.73. Found (percent): C, 66.84; H, 8.41; N, 7.50.

Example 3.—1-methyl-2-(2-methoxyphenoxy)-ethylguanidine nitrate

An intimate mixture of the amine of Example 2 (3 g., 0.0165 mole) and 1-amidino-3,4-dimethylpyrazole nitrate (3 g., 0.015 mole) is heated under nitrogen at an oil bath temperature of 100° for 3 hours. The cooled melt is triturated repeatedly with portions of dry ether until only a white powder remains. This is filtered, dried, and recrystallized from ethanol-ether to give 1-methyl-2-(2-methoxyphenoxy)-ethylguanidine nitrate as small white nonhygroscopic flakes, M.P. 109–110°.

Analysis.—Calcd. for $C_{11}H_{18}N_4O_5$ (percent): C, 46.14; H, 6.34; N, 19.57. Found (percent): C, 45.82; H, 6.41; N, 19.70.

Example 4.—1-(2-methoxy-5-fluorophenoxy)-2-propanone oxime

The procedure of Example 1 was repeated using 45.0 g. (0.23 mole) of 1-(2-methoxy-5-fluorophenoxy)-2-propanone as the ketone. The 1-(2-methoxy-5-fluorophenoxy)-2-propanone oxime was obtained by recrystallization from benzene-petroleum ether as off-white flakes which melted at 81.5–83°.

Example 5.—1-methyl-2-(2-methoxy-5-fluorophenoxy)-ethylamine hydrochloride

A solution of the oxime of Example 4 (27.6 g., 0.13 mole) was reacted as described in Example 2. The desired amine was obtained by distillation in the form of an oil, B.P. 83–86° (0.1 mm.). The hydrochloride salt, 1-methyl-2 - (2-methoxy-5-fluorophenoxy)-ethylamine hydrochloride, was formed by conventional means and had a melting point of 134–136° C.

Analysis.—Calcd. for $C_{10}H_{15}ClFNO_2$ (percent): C, 50.96; H, 6.42; N, 5.95. Found (percent): C, 51.39; H, 6.91; N, 5.89.

Example 6.—1-methyl-2-(2-methoxy-5-fluorophenoxy)-ethylguanidine nitrate

The amine of Example 5 (6.6 g.) was treated as described in Example 3. Upon recrystallization from ethanol, 1 - methyl-2-(2-methoxy-5-fluorophenoxy)-ethylguanidine nitrate was obtained in the form of small white flakes, M.P. 143–145.5°, a purified analytical sample melting at 145–146.5°.

Analysis.—Calcd. for $C_{11}H_{17}FN_4O_5$ (percent): C, 43.43; H, 5.64; F, 6.52; N, 18.41. Found (percent): C, 43.63; H, 5.71; F, 5.94; N, 18.20.

Example 7.—1-acetoxy-2-fluorobenzene m-Fluorophenol (176 g., 1.57 moles) and acetyl chloride (134 g., 1.7 moles) are combined and warmed on the steam bath for 1 hour under reflux. The excess acetyl chloride is removed with a stream of nitrogen to obtain a colorless oil.

Example 8.—2-hydroxy-3-fluoroacetophenone

A slurry of 242 g. (1.57 moles) of 1-acetoxy-2-fluorobenzene and 228 g. (1.7 moles) of aluminum chloride are heated in an oilbath at 180–185° for 45 minutes at which time a solid mass forms. The mixture is cooled and diluted with 1500 ml. 5% hydrochloric acid solution and steam distilled. After exhaustive steam distillation 51.93 g. of 2-hydroxy-3-fluoroacetophenone as a white solid is obtained. The pot residue contains the p-isomer which crystallizes on cooling.

Example 9.—2-methoxy-3-fluoroacetophenone

In 250 ml. of dimethylformamide is placed 25.0 g. (0.163 mole) of 2-hydroxy-3-fluoroacetophenone, 22.7 g. (0.18 mole) of dimethylsulfate and 150 g. of potassium carbonate. The mixture is refluxed 3 hours, cooled, and poured into 4 liters water, extracted with ether, washed with brine, and dried. Removal of solvent affords an oil which is distilled (B.P. 107°/30 mm. Hg) to give 25.0 g. of 2-methoxy-3-fluoroacetophenone as a colorless oil.

Example 10.—2-methoxy-3-fluorophenol

In 450 ml. chloroform is dissolved 31.46 g. (0.187 mole) of 2-methoxy-3-fluoroacetophenone and 87.82 g. (0.51 mole) of m-chloroperbenzoic acid. A crystal of p-toluene sulfonic acid is added and the mixture stirred at room temperature for 48 hours, poured into 2 liters water, washed with saturated sodium carbonate solution (5× 200 ml.), dried over sodium sulfate, and the solvent evaporated to give a cloudy oil. The oil is dissolved in a solution consisting of 100 ml. water, 100 ml. ethanol, and 10 g. sodium hydroxide. The mixture is refluxed on the steam bath for 10 minutes, after which the solvent is evaporated. The dark residue is dissolved in 200 ml. water and acidified with concentrated hydrochloric acid and extracted with ether. Evaporation of the ether gives a dark oil which is distilled (B.P. 90–100°/30 mm. Hg) to give 13.43 g. of 2-methoxy-3-fluorophenol as a colorless oil.

Example 11.—1-(3-fluoro-2-methoxyphenoxy)-2-propanone

A mixture of 13.15 g. (0.141 mole) of chloroacetone and 0.3 g. of crushed KI in 75 ml. of acetone is refluxed for 1 hour, after which it is cooled and filtered.

To a solution of 13.4 g. (0.094 mole) of 3-fluoro-2-methoxyphenol in 75 ml. of acetone is added 3.26 g. (0.024 mole) of $K_2CO_3$ and one fourth volume of the above chloroacetone solution. This procedure is repeated until a total of 13.1 g. (0.094 mole) of $K_2CO_3$ and all the chloroacetone solution have been added in 1 hour at 23°. An additional 6.51 g. (0.047 mole) of $K_2CO_3$ is then added, and the mixture stirred at 23° for 1 hour, and refluxed for 16 hours. The mixture is cooled, filtered, and the filtrate concentrated to yield an oil which is distilled through a 2″ 19/38 column to yield 15.8 g. of 1-(3-fluoro-2-methoxyphenoxy)-2-propanone as a clear yellow oil.

Example 12.—1-(3-fluoro-2-methoxyphenoxy)-2-propanone oxime

A solution of 15.8 g. (0.08 mole) of 1-(3-fluoro-2-methoxyphenoxy)-2-propanone, 6.12 g. (0.088 mole) of hydroxylamine hydrochloride, and 11.95 g. (0.008 mole) of sodium acetate trihydrate in 185 ml. of SDA-30/water (50:50) is heated at 40–45° for 17 hours. The solution is then concentrated until an oil precipitates. Water (300 ml.) is added and the mixture extracted twice with 75 ml. portions of $CHCl_3$. The combined extracts are washed with water, dried and concentrated to yield a solid which is recrystallized from benzene/n-heptane to yield 13.2 g. of 1-(3-fluoro-2-methoxyphenoxy)-2-propanone oxime as a white solid, M.P. 60–77°.

Example 13.—1-methyl-2-(2-methoxy-3-fluorophenoxy)-ethylguanidine nitrate

A mixture of 7.0 g. (0.035 mole) of 1-(3-fluoro-2-methoxyphenoxy)-2-propylamine and 6.3 g. (0.032 mole) of 1-amidino-3,5-dimethylpyrazole nitrate is heated at 115–120° for 3 hours with stirring. It is then cooled to yield a viscous semisolid which is recrystallized twice from activated charcoal treated ethanol to yield 5.6 g. of 1-methyl-2-(2-methoxy-3-fluorophenoxy)-ethylguanidine nitrate as a white solid, M.P. 123–125°.

*Analysis.*—Calcd. for $C_{11}H_{17}FN_4O_5$ (percent): C, 43.42; H, 5.64; N, 18.41. Found (percent): C, 43.71; H, 5.81; N, 18.71.

Example 14.—1-acetoxy-4-fluorobenzene p-Fluorophenol (51.52 g., 0.460 mole) and 39.3 g. (0.50 mole) of acetyl chloride are combined and warmed on the steam bath for 1 hour until all the hydrochloric acid has evolved to give 70.83 g. of 1-acetoxy-4-fluorobenzene as an oil.

Example 15.—2-hydroxy-5-fluoroacetophenone 1-acetoxy-4-fluorobenzene (70.83 g., 0.460 mole) and 67.0 g. (0.50 mole) aluminum chloride are intimately mixed and warmed to 160–170° for 1 hour and 40 minutes. A thick mass results which is cooled and suspended in water. The system is steam distilled to give 64.26 g. of 2-hydroxy-5-fluoroacetophenone as a white solid, M.P. 49–53°.

Example 16.—2-benzyloxy-5-fluoroacetophenone

In 200 ml. dimethylformamide is dissolved 64.26 g. (0.417 mole) of 2-hydroxy-5-chloroacetophenone and 57.0 g. (0.45 mole) of benzyl chloride. Potassium carbonate is suspended and the mixture stirred and heated briefly to 110° and then 70° C. for 3 hours. The mixture is cooled and poured into 2 liters water, extracted into ether, washed with 10% sodium hydroxide solution and water. The ether solution is dried with sodium sulfate and evaporated to give a solid residue which is recrystallized from 600 ml. n-heptane to give 92.1 g. of 2-benzyloxy-5-fluoroacetophenone as a tan solid, M.P. 49–51°.

Example 17.—1-acetoxy-2-benzyloxy-5-fluorobenzene

In 500 ml. chloroform is dissolved 53.6 g. (0.22 mole) 2-benzyloxy-5-fluoroacetophenone and 50.0 g. (0.246 mole) 85% m-chloroperbenzoic acid. A crystal of p-toluenesulfuric acid is added and the mixture stirred at room temperature for 24 hours. A precipitate of m-chlorobenzoic acid forms during this time. The system is washed three times with 10% sodium carbonate solution and twice with water, dried and the solvent evaporated to give 54.57 g. of 1-acetoxy-2-benzyloxy-5-fluorobenzene as a crystalline solid.

Example 18.—2-benzyloxy-5-fluorophenol

In 200 ml. of 10% sodium hydroxide solution and 150 ml. of ethanol is dissolved 54.57 g. (0.21 mole) of 1-acetoxy-2-benzyloxy-5-fluorobenzene. The solution is warmed on the steam bath for 20 minutes and the excess ethanol evaporated in vacuo. The system is diluted with 200 ml. water and washed with ether. The aqueous phase is neutralized with 10% hydrochloric acid, extracted with ether, washed with water and dried to give 36.15 g. of 2-benzyloxy-5-fluorophenol as a dark oil.

Example 19.—1-methoxy-2-benzyloxy-5-fluorobenzene

In 150 ml. of dimethylformamide is dissolved 39.72 g. (0.183 mole) of 2-benzyloxy-5-fluorophenol and 25.4 g. (0.20 mole) of methyl sulfate. Potassium carbonate (100 g.) is suspended and the mixture stirred overnight at 95° C., poured into 2 liters water and extracted with ether. The ether solution is washed with sodium hydroxide, water, and dried. Evaporation of the solvent affords 18.20 g. of 1-methoxy-2-benzyloxy-5-fluorobenzene as a dark oil.

Example 20.—2-methoxy-4-fluorophenol

In 250 ml. ethanol is dissolved 18.20 g. (0.0785 mole) of 1-methoxy-2-benzyloxy-5-fluorobenzene and 2.0 g. of 10% palladium on carbon. The mixture is shaken with hydrogen (40 p.s.i.) until the theoretical uptake was attained. The solvent is filtered and evaporated to give 10.0 g. of 2-methoxy-4-fluorophenol as an oil.

Example 21.—1-(4-fluoro-2-methoxyphenoxy)-2-propanone

To a solution of 22.0 g. (0.24 mole) of chloroacetone in 45 ml. of acetone is added 0.4 g. of crushed KI crystals and the mixture refluxed for 1.25 hours after which it is cooled and filtered.

To a solution of 22.5 g. (0.16 mole) of 2-methoxy-4-fluorophenol in 95 ml. of acetone is added 5.45 g. (0.039 mole) of anhydrous $K_2CO_3$ and ¼ portion of the chloroacetone solution. This procedure is repeated three times until 21.8 g. (0.158 mole of $K_2CO_3$) and all the chloroacetone solution had been added in 50 minutes at 23°. The mixture is then stirred 10 minutes at 23° after which an additional 10.9 g. (0.078 mole) of $K_2CO_3$ is added. The mixture is refluxed for 15.5 hours, cooled and filtered. The filtrate is concentrated to yield an oil which solidified. The material is recrystallized twice from ethanol/water to yield 21.8 g. of 1-(4-fluoro-2-methoxyphenoxy)-2-propanone as a yellow solid, M.P. 52–60°.

Example 22.—1-(4-fluoro-2-methoxyphenoxy)-2-propanone oxime

A mixture of 21.8 g. (0.11 mole) of 1-(4-fluoro-2-methoxyphenoxy)-2-propanone, 8.5 g. (0.122 mole) of hydroxylamine hydrochloride and 16.6 g. (0.122 mole) of sodium acetate trihydrate in 260 ml. of 50:50 ethanol-30/water is heated at 40° for 17 hours. The solution is then concentrated until an oil precipitates. Water (100 ml.) is then added and the mixture extracted twice with 75 ml. portions of $CHCl_3$. The combined extracts are washed with brine, dried and concentrated to yield a viscous oil which is crystallized from activated charcoal treated ethanol/water (100 ml.:150 ml.) to yield 21.2 g. of 1-(4-fluoro-2-methoxyphenoxy)-2-propanone oxime as a light yellow solid, M.P. 70–85°.

*Analysis.*—Calcd. for $C_{10}H_{12}FNO_3$ (percent): C, 56.34; H, 5.68; N, 6.57. Found (percent): C, 57.49; H, 5.71; N, 6.01.

Example 23.—1-(4-fluoro-2-methoxyphenoxy)-2-propylamine

A mixture of 20.2 g. (0.095 mole) of 1-(4-fluoro-2-methoxyphenoxy)-2-propanone oxime and 1 spoonful of Raney nickel (washed four times with ethanol) in sufficient ethanol to make a total volume of 180 ml. is stirred under hydrogen (1000 p.s.i.) at 40° until the theoretical amount (706 p.s.i.) has been taken up in 3.5 hours. The mixture is cooled, the catalyst removed by filtration and the filtrate concentrated to yield an oil which is distilled through a 2″ 19/38 column to yield 15.1 g. of 1-(4-fluoro-2-methoxyphenoxy)-2-propylamine as a clear colorless liquid, B.P. 83–86°/0.4 mm.

Example 24.—1-methyl-2-(2-methoxy-4-fluorophenoxy)-ethylguanidine nitrate

A mixture of 10.0 g. (0.05 mole) of 1-(4-fluoro-2-methoxyphenoxy)-2-propylamine and 9.02 g. (0.045 mole) of 1-amidino-3,5-dimethylpyrazole nitrate is heated at 115–120° for 3 hours with efficient stirring. It is then cooled and 100 ml. of ether added and refluxed for 0.5 hour. The solid is collected and recrystallized twice from ethanol to yield 5.38 g. of 1-methyl-2-(2-methoxy-4-fluorophenoxy)-ethylguanidine nitrate as white crystals, M.P. 143.5–147°.

Analysis.—Calcd. for $C_{11}H_{17}FN_4O_5$: C, 43.42; H, 5.64; N, 18.41. Found (percent): C, 43.02; H, 5.79; N, 18.06.

Example 25.—1-methyl-2-(2-methoxy-6-fluorophenoxy)-ethylguanidine nitrate

A mixture of 7.0 g. (0.035 mole) of 1-(6-fluoro-2-methoxyphenoxy)-2-propylamine and 6.3 g. (0.032 mole) of 1-amidino-3,5-dimethylpyrazole nitrate is heated at 115–120° for 3 hours with efficient stirring. After cooling, 125 ml. of ether is added and refluxed for 1 hour. It is then cooled and the ether decanted from the viscous oil which is crystallized twice from acetonitrile/ether and once from acetonitrile to yield 4.88 g. of 1-methyl-2-(2-methoxy-6-fluorophenoxy)-ethylguanidine nitrate as a white solid, M.P. 99–102°.

Example 26.—1-methyl-2-(2-methoxy-5-trifluoromethylphenoxy)-ethylguanidine nitrate A mixture of 6.5 g. (0.026 mole) of 1-(5-trifluoromethyl-2-methoxyphenoxy)-2-propylamine and 4.7 g. (0.024 mole) of 1-amidino-3,5-dimethylpyrazole nitrate is heated at 115–120° for 3 hours with efficient stirring. It is then cooled to yield a solid which is recrystallized twice from 2-propanol to yield 4.1 g. of 1-methyl-2-(2-methoxy-5-trifluoromethylphenoxy)-ethylguanidine nitrate as a white solid, M.P. 175–178°.

Analysis.—Calcd. for $C_{12}H_{17}F_3N_4O_5$ (percent): C, 40.67; H, 4.84; N, 15.81. Found (percent): C, 40.99; H, 5.15; N, 15.41.

We claim:
1. A compound of the formula

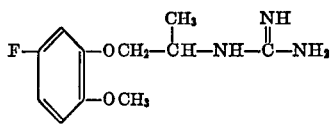

or a salt thereof of a pharmaceutically acceptable acid.

2. 1-methyl-2-(2-methoxy-5-fluorophenoxy)-ethylguanidine nitrate.

References Cited
UNITED STATES PATENTS 3,209,023   9/1965   Copp et al. _____ 260—564 X LEON ZITVER, Primary Examiner G. A. SCHWARTZ, Assistant Examiner U.S. Cl. X.R.

260—566 A, 570.6; 424—326